US012450516B2

(12) United States Patent
Griffin et al.

(10) Patent No.: US 12,450,516 B2
(45) Date of Patent: Oct. 21, 2025

(54) QUBIT MAPPED DIAMOND DEPENDENCY RECOMMENDATION SERVICE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 622 days.

(21) Appl. No.: 17/874,167

(22) Filed: Jul. 26, 2022

(65) Prior Publication Data

US 2024/0037440 A1    Feb. 1, 2024

(51) Int. Cl.
| | |
|---|---|
| G06F 8/70 | (2018.01) |
| G06N 10/40 | (2022.01) |
| G06N 10/60 | (2022.01) |
| G06N 10/80 | (2022.01) |

(52) U.S. Cl.
CPC ............. *G06N 10/60* (2022.01); *G06N 10/40* (2022.01); *G06N 10/80* (2022.01)

(58) Field of Classification Search
CPC ....................................................... G06F 8/70
See application file for complete search history.

(56) References Cited

U.S. PATENT DOCUMENTS

| | | | |
|---|---|---|---|
| 11,238,359 B2 | 2/2022 | Chen et al. | |
| 2009/0070402 A1 | 3/2009 | Rose et al. | |
| 2020/0004528 A1 | 1/2020 | Pape et al. | |
| 2022/0101167 A1 | 3/2022 | Pakhomchik et al. | |
| 2023/0196153 A1* | 6/2023 | Naveh .................... | G06N 10/20 |
| | | | 703/14 |

(Continued)

FOREIGN PATENT DOCUMENTS

CN        116882506 A  * 10/2023

OTHER PUBLICATIONS

Coutts, Duncan. "Solving the Diamond Dependency Problem", Well-Typed: The Haskell Consultants blog post located on the Internet at: https://well-typed.com/blog/2008/08/solving-the-diamond-dependency-problem/ (Aug. 19, 2008), 6 pages.

(Continued)

*Primary Examiner* — Jae U Jeon
(74) *Attorney, Agent, or Firm* — Womble Bond Dickinson (US) LLP

(57) ABSTRACT

Embodiments of the present disclosure provide techniques for performing a quantum computing-based diamond dependency analysis. A classical diamond dependency service may analyze a service and determine a set of dependencies that the service requires to execute. The classical DDS may then generate a quantum assembly language (QASM) file comprising a diamond dependency algorithm (DDA) and a mapping of a configuration file of the service and a configuration file of each of the set of dependencies to a respective qubit among a plurality of qubits. The classical DDS may interface with one or more quantum DDSs (QDDSs) that are each part of a respective quantum environment in order to determine qubits that are available to be mapped to the configuration files of the service and its dependencies. The classical DDS may execute the QASM file using the one or more QDDSs to detect one or more diamond dependencies.

17 Claims, 7 Drawing Sheets

(56) References Cited

U.S. PATENT DOCUMENTS

2024/0134711 A1* 4/2024 Fang .................. G06N 10/00

OTHER PUBLICATIONS

Kuo et al. "Entanglement-Enhanced Quantum-Inspired Tabu Search Algorithm for Function Optimization", in IEEE Access, vol. 5 (Jul. 4, 2017), pp. 13236-13252, Digital Object Identifier 10.1109/ACCESS.2017.2723538.
Li et al. "Qubit Mapping Based on Subgraph Isomorphism and Filtered Depth-Limited Search", arXiv:2004.07138v3 [quant-ph] (Sep. 22, 2021), 12 pages.
Steinberg, Matthew et al. "Topological-Graph Dependencies and Scaling Properties of a Heuristic Qubit-Assignment Algorithm", arXiv:2103.15695v2 [quant-ph] (Mar. 14, 2022), 15 pages, Digital Object Identifier 10.1109/TQE.2020.DOI.

* cited by examiner

QUBIT MAPPED DIAMOND DEPENDENCY RECOMMENDATION SERVICE

TECHNICAL FIELD

Aspects of the present disclosure relate to detection of diamond dependencies among services using quantum hardware.

BACKGROUND

A container-orchestration system may automate many of the manual processes involved in deploying, managing, and scaling containerized applications. For example, a container-orchestration system for developing and running containerized applications may allow applications and the data centers that support them to expand from just a few machines and applications to thousands of machines that serve millions of clients. Services, such as a containerized application for example, are deployed within a node or group of nodes (hereinafter, "cluster") of a container-orchestration system (e.g., Redhat™ OpenShift™ module on a Kubernetes® platform) and may depend on other services/libraries and their respective resources that are deployed within and outside the cluster in order to execute. For example, a web service may depend on a resource such as a database, in order to be able to persist its data. The services/libraries that a service depends on may be referred to herein as dependencies.

A particular service may be deployed and connected to dependencies on which the particular service directly depends (referred to as first level dependencies), and each first level dependency may in turn may depend on other dependencies (second level dependencies) and this may go down several levels. The first level dependencies required by the particular service may be indicated by a configuration file of the particular service, and each first level dependency may in turn have a configuration file indicating second level dependencies that the respective first level dependency relies on to execute. The dependencies required at every level for a particular service may be visualized as a "dependency tree."

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
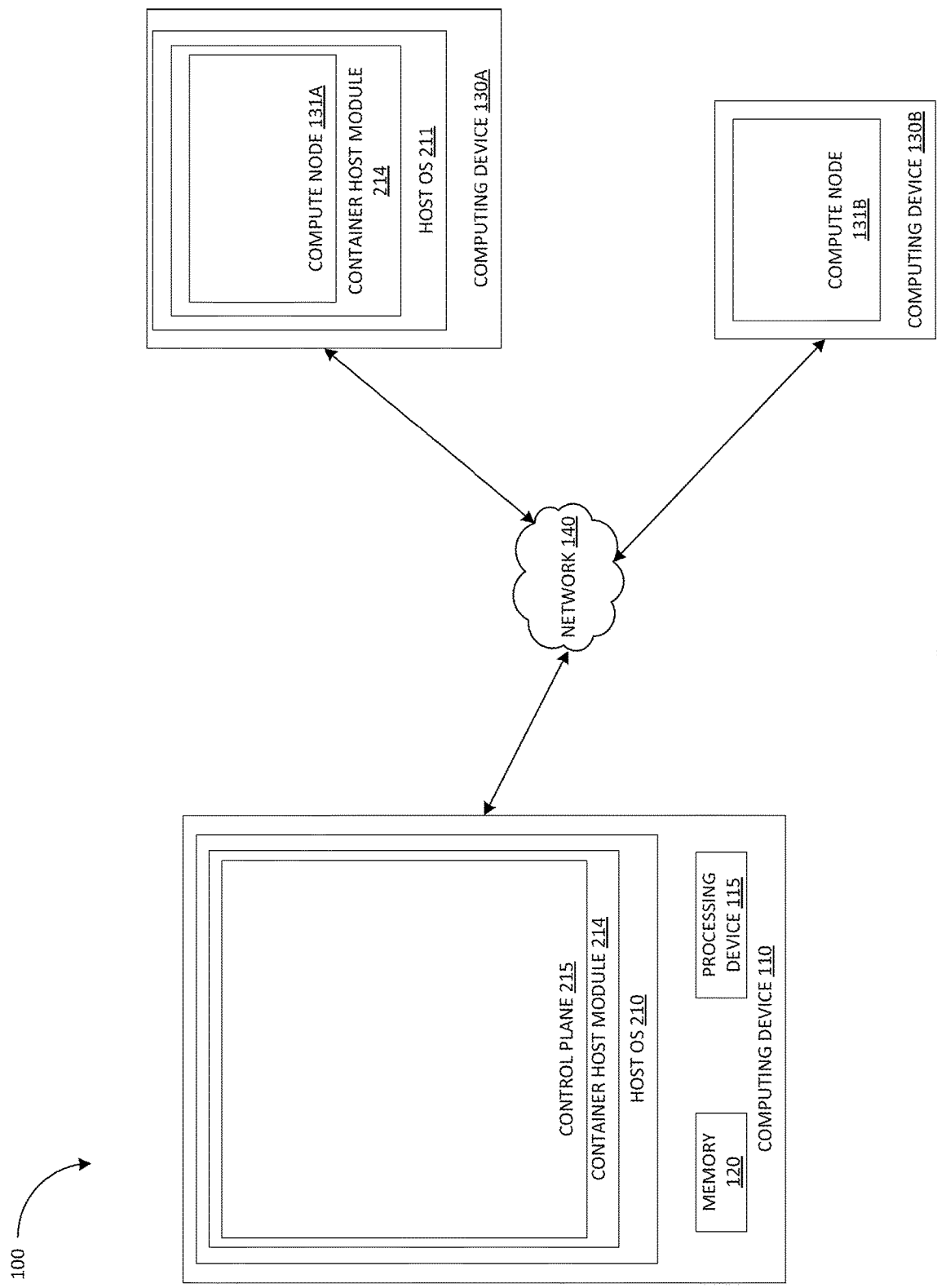
FIG. 1 is a block diagram that illustrates an example system, in accordance with some embodiments of the present disclosure.

A diamond dependency conflict is a scenario where two or more dependencies in a dependency tree consume (i.e., depend on) a common e.g., library using versioned references, and none of the common library versions in those references contain all of the features required to run the two or more dependencies. Consequently, it is not possible to select a set of versions of the library that form a working service. In order to make timely decisions about service deployment, it is critical to be able to identify, resolve, and/or prevent a promotion of a service to a new environment that would create a diamond dependency. While diamond dependency checkers and tools exist, the diamond dependency problem is NP-complete, and thus the timing and responsiveness of these existing tools generally do not meet performance expectations, particularly in cloud deployment scenarios.

The present disclosure addresses the above-noted and other deficiencies by providing techniques for performing a quantum computing-based diamond dependency analysis. A classical diamond dependency service (DDS) may analyze a service and determine a set of dependencies that the service requires to execute. The classical DDS may then generate a quantum assembly language (QASM) file comprising a mapping of a configuration file of the service and a configuration file of each of the set of dependencies to a respective qubit among a plurality of qubits. The classical DDS may interface with one or more quantum DDSs (QDDSs) that are each part of a respective quantum environment in order to determine qubits that are available to be mapped to the configuration files of the service and its dependencies. Each quantum environment has a subset of the plurality of qubits. The QASM file may further comprises a diamond dependency algorithm (DDA) that has been encoded in a quantum language. The classical DDS may execute the QASM file using the one or more QDDSs to detect one or more diamond dependencies based on the DDA and the mapping of the configuration file of the service and the configuration file of each of the set of dependencies to a respective qubit among a plurality of qubits.

Quantum computing is a type of computation that harnesses the collective properties of quantum states, such as superposition, interference, and entanglement, to perform calculations. The devices that perform quantum computations are known as quantum computers. Although there are different types of quantum computers, one of the most widely used is the quantum circuit, based on the quantum bit (also referred to as a "qubit"). A qubit can be in a 1 or 0 quantum state, or in a superposition of the 1 and 0 states. When it is measured, however, it is always 0 or 1 and the probability of either outcome depends on the qubit's quantum state immediately prior to measurement. Using non-quantum hardware, a search problem with a search space of N items requires examination of the search space on the order of N times to find the item being sought. However, quantum hardware may solve the search problem after examining the search space approximately $\sqrt{N}$ times.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130A respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS of each of the computing device 110 and the computing devices 130, as discussed in further detail herein. The container host 214 may be a platform for developing and running containerized applications and may allow applications and the data centers that support them to expand from just a few machines and applications to thousands of machines that serve millions of clients. The container host 214 may provide an image-based deployment module for creating containers and may store one or more image files for creating container instances. The container host 214 may include a storage driver (not shown), such as OverlayFS, to manage the contents of an image file including the read only and writable layers of the image file.

An image file may be stored by the container host 214 or a registry server (not shown). In some embodiments, the image file may include one or more base layers. An image file may be shared by multiple containers. When the container host 214 creates a new container, it (e.g., via the storage driver) may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image. The container host 214 may also facilitate interactions between a container and the resources of a computing device (e.g., computing device 110 or a computing device 130) and may manage requests from a container to access certain packages or libraries of the host OS 211.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster 131).

A typical deployment of the container host 214 may include a control plane 215 and a cluster of compute nodes 131, including compute nodes 131A and 131B (also referred to as compute machines). The compute nodes 131 may run the aspects of the container host 214 that are needed to launch and manage containers, pods, and other objects. For example, a compute node may be a physical server that provides the processing capabilities required for running containers in the environment. A compute node may also be implemented as a virtual server, logical container, or GPU, for example.

While the container host 214 may allow different containers to share the host OS (e.g., the OS kernel, packages, binaries, libraries thereof etc.), many application instances can be running in containers on a single host without visibility into each other's processes, files, network, and so on. Each container may provide a single service (often called a "micro-service") or component of an application, such as a web server or a database (though containers can also be used for arbitrary workloads) or may provide one or more services 224 (as shown in FIG. 2), each of which may be any service that requires certain other services/libraries to facilitate its operation. In this way, the container host 214 can provide a function-based architecture of smaller, decoupled units that work together. Hereinafter, the services/libraries that a particular service requires to operate may be referred to as dependencies of the particular service. As discussed herein, each of the dependencies of a particular service may have dependencies of their own.

As discussed above, the host OS 221 may comprise a plurality of dependencies (e.g., services, packages, binaries, libraries), each of which may be a program that provides certain functionality for executing a service 224 (i.e., may be a service or library on which the service 224 depends). The container host 214 may also include a software package manager (not shown) that interfaces with repositories in a package repository (not shown) to search for dependencies, as well as install, update, and remove dependencies on host OS 211. The software package manager may be any appropriate package management software such as Dandified Yum, for example. The software package manager may automatically compute dependencies of a service 224 and determine any actions required to install such dependencies. Each of the plurality of dependencies may be in any appropriate format, such as e.g., the ".rpm" format. Stated differently, each dependency may comprise an RPM file (e.g., based on Fedora, RHEL, etc.) or any other appropriate operating system packaging unit. The software package manager may install, update, and remove dependencies on any computing device 110 or 130. The software package manager may facilitate maintenance of dependencies by automatically checking for further dependencies and determining the actions required to install those dependencies.

However, as discussed above, a diamond dependency conflict is a scenario where two or more e.g., dependencies in a dependency tree consume a common dependency using versioned references, and none of the common dependency versions in those references contain all of the features that a consumer expects. Consequently, it is not possible to select a set of versions that form a working program. In order to make timely decisions about service deployment, it is critical to be able to identify, resolve, and/or prevent a promotion of a service to a new environment that would create a diamond dependency. While diamond dependency checkers and tools exist, the diamond dependency problem is NP-complete, and thus the timing and responsiveness of these existing tools generally do not meet expectations, particularly in cloud deployment scenarios.

Figure 2A:
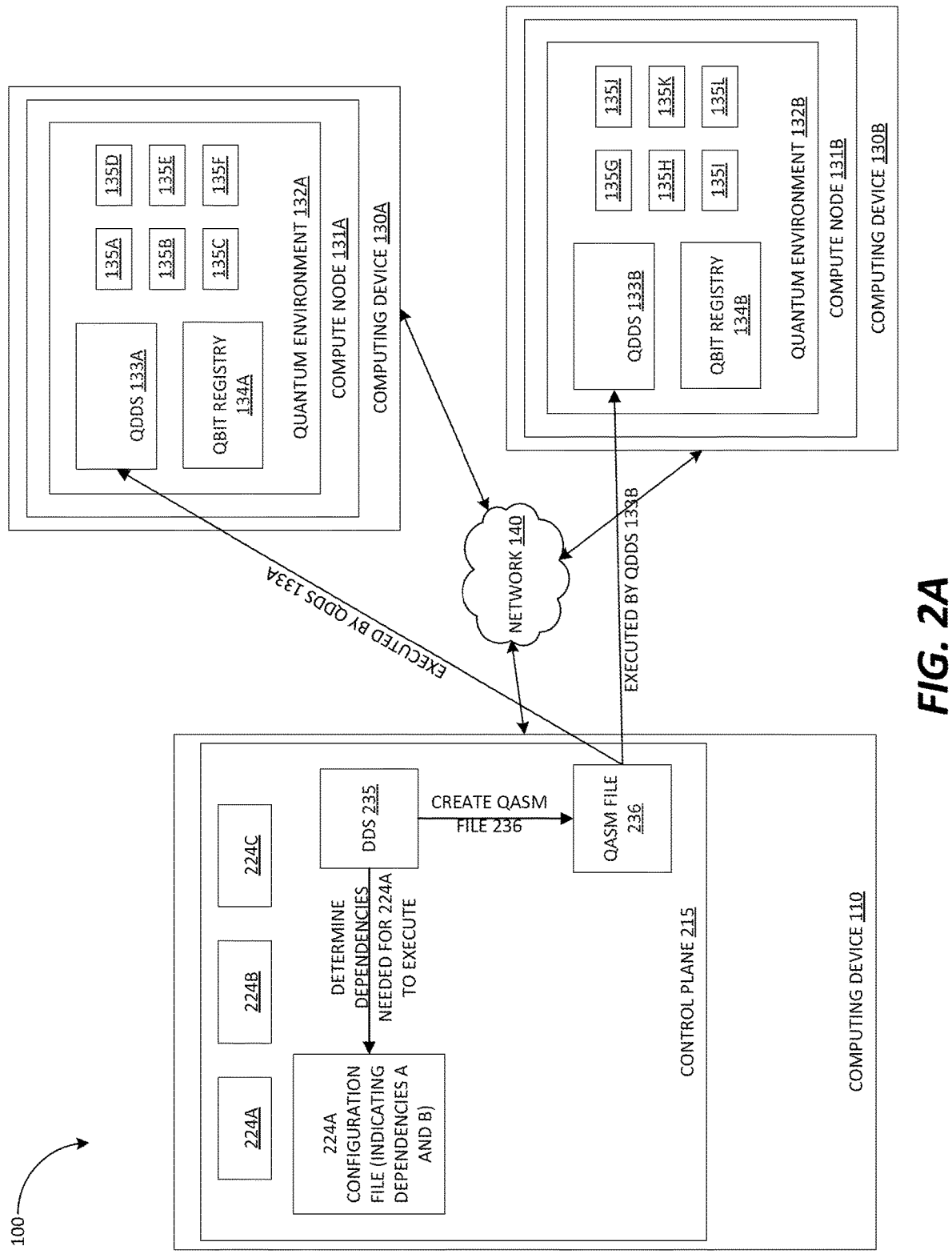
FIG. 2A is a block diagram that illustrates an example system for diamond dependency analysis, in accordance with some embodiments of the present disclosure.

FIG. 2A illustrates the system 100 in accordance with some embodiments of the present disclosure. As shown in FIG. 2, the computing device 110 includes a classical diamond dependency service 235 (hereinafter referred to as DDS 235) that may monitor the configuration files of each of the services 224 within the system 100. It should be noted that although FIG. 2 illustrates all of the services 224 as hosted on computing device 110 for ease of illustration and description, this is not a limitation and the services 224 may each be hosted on any appropriate computing device 110 or 130. The DDS 235 may take as input the configuration file for each service 224 and generate a dependency tree of the dependencies required for each service 224 to execute. Because the dependencies of a service 224 may have dependencies themselves (and this can go down several levels), the DDS 235 can analyze the configuration file of each first level dependency (i.e., dependencies that a service 224 directly relies on), generate a second level dependency tree indicating second level dependencies that each first level dependency depends on, and continue in this manner until all dependencies at every level of the service 224 are plotted in its dependency tree. The dependencies required for a service 224 to execute may refer to all dependencies at every level of the service 224.

The DDS 235 may generate a QASM file 236 and for each particular service 224, the DDS 235 may create an entry 225 (shown in FIG. 3) in the QASM file 236 with a mapping of the configuration file for that particular service 224 and each dependency in that particular service 224's dependency tree to a respective qubit 135. Whenever a service 224 is modified (whether a new dependency has been added or an existing dependency removed), the DDS 235 updates the relevant entry 225 in the QASM file 236. As shown in FIG. 2, each of the computing devices 130 may include a respective quantum environment 132 comprising a quantum DDS (QDDS) 133, a qubit registry 134, and a set of qubits 135. Each QDDS 133 may include a quantum computer (not shown) which may be any appropriate quantum computing device as discussed hereinabove.

Figure 2B:
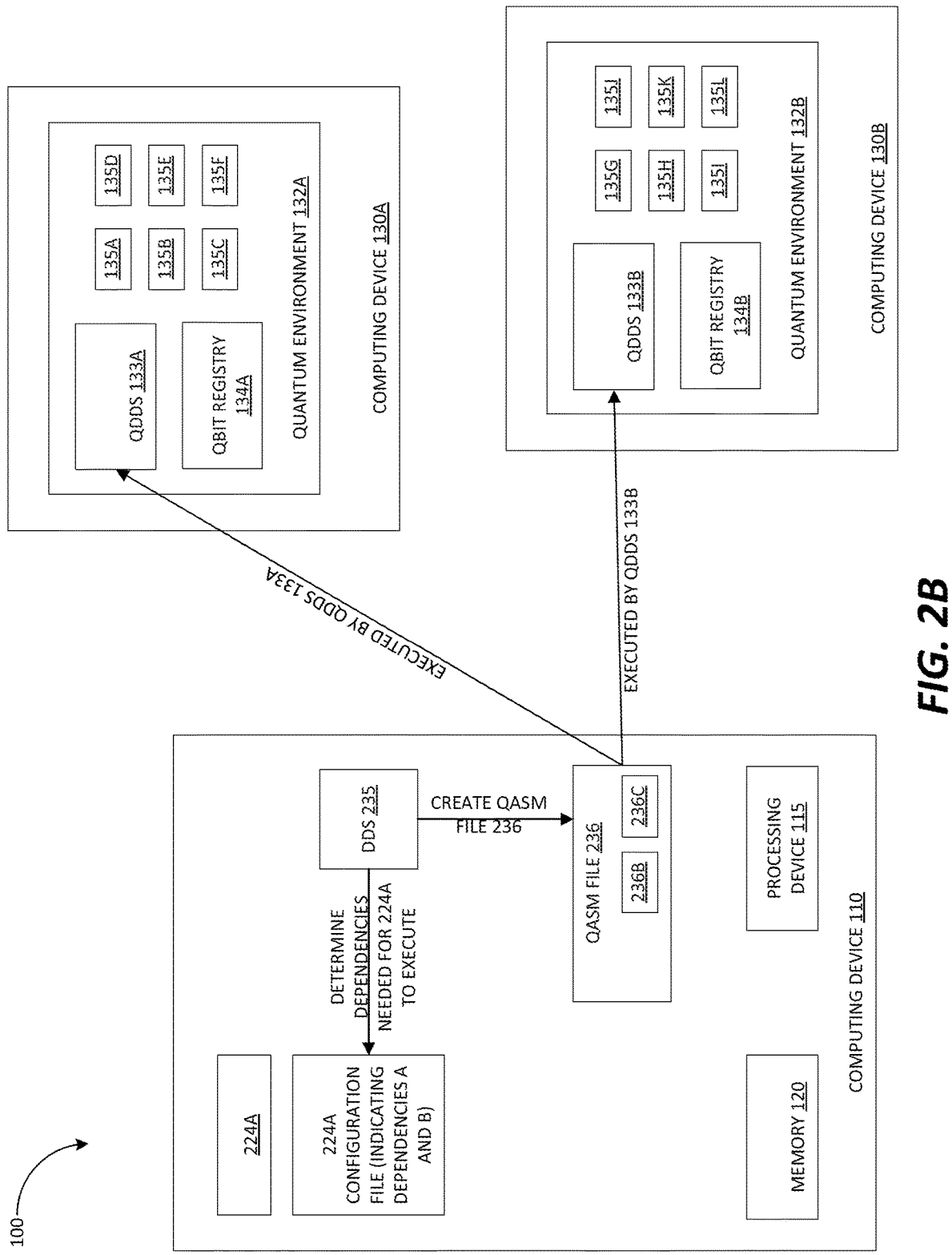
FIG. 2B is a block diagram that illustrates an example system for diamond dependency analysis, in accordance with some embodiments of the present disclosure.
Figure 3A:
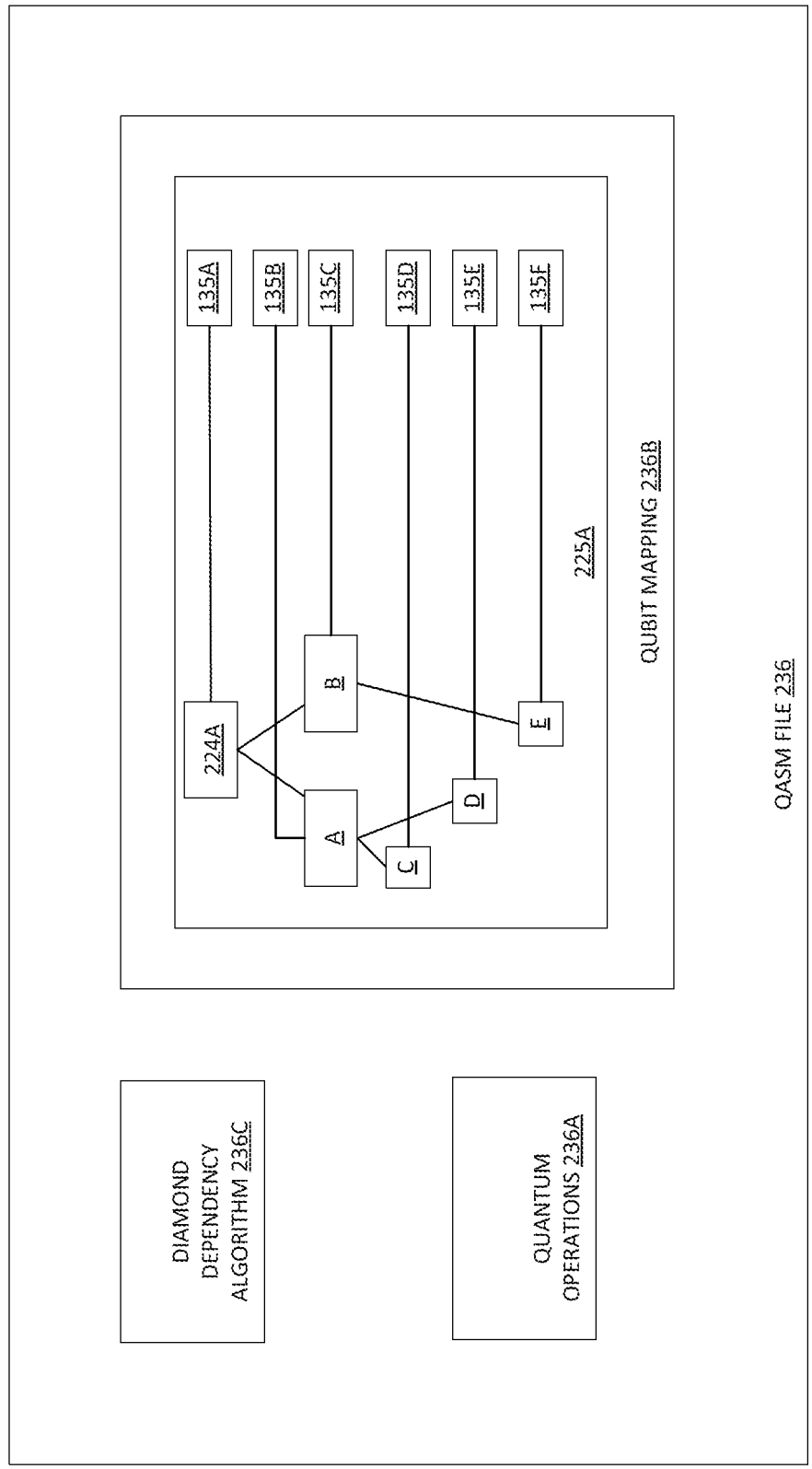
FIG. 3A is a block diagram that illustrates a mapping of configuration files to qubits, in accordance with some embodiments of the present disclosure.

FIG. 3 illustrates a detailed view of the QASM file 236 in accordance with some embodiments of the present disclosure. The QASM file 236 may include quantum operations 236A, qubit mappings 236B, and a diamond dependency algorithm (DDA) 236C. The DDA 236C may be encoded as a quantum program in the QASM file 236. Referring simultaneously to FIGS. 2A, 2B, and 3, the DDS 235 may perform a dependency analysis of each of the services 224 to generate a dependency tree for each of the services 224 as discussed hereinabove. For each particular service 224, the DDS 235 may create an entry 225 in the qubit mapping 236B where the DDS 235 may map the configuration file for the particular service 224 and the configuration file of each dependency in the particular service 224's dependency tree to a qubit 135 of the system 100 in a 1 to 1 relationship.

Referring to FIGS. 2A, 2B, and 3 (illustrating this process with respect to service 224A) simultaneously, the DDS 235 may create entry 225A within qubit mapping 236B and connect to a QDDS 133 (e.g., QDDS 133A), so as to interface with the qubit registry 134A and determine which qubits 135A-F are available. The qubit registry 134A may report its available qubits 135 so that the DDS 235 may make this determination. The DDS 235 may determine that qubits 135A-F are all available and (using the quantum operations 236A) directly annotate the QASM file 236 (and particularly, the qubit mapping 236B) with the details of the qubits 135 determined to be available (i.e., qubits 135A-F), while the QDDS 133A locks down qubits 135A-F. This ensures that there will be a general mapping of configuration files to real qubits 135 on a physical quantum environment 132.

The DDS 235 may map qubit 135A to the configuration file of service 224A. The configuration file of service 224A may indicate that service 224A is dependent on dependencies A and B (shown as "A" and "B" in FIG. 3), and thus the DDS 235 may map qubits 135B and 135C to the configuration files of dependencies A and B (i.e., first level dependencies of service 224A) respectively. The configuration file of dependency A may indicate the dependencies that dependency A is dependent on (dependencies C and D as shown in FIG. 3) and the configuration file of dependency B may indicate the dependencies that dependency B is dependent on (dependency E as shown in FIG. 3). Thus, the DDS 235 (using the quantum operations 236A) may map additional qubits 135, namely qubits 135D, E, and F to the configuration files of dependencies C, D, and E (i.e., second level dependencies) respectively of dependencies A and B. For qubit 135A (mapped to the configuration file for service 224A), the DDS 235 may encode within the qubit mapping 236B, qubit 135A's relationship with qubits 135B and 135C (not shown), which represent (are mapped to) configuration files of dependencies A and B respectively. The DDS 235 may also encode in the qubit mapping 236B, a reference to this relationship between qubit 135A and qubits 135B and 135C. Similarly, for each of qubits 135B and 135C, the DDS 235 may perform a similar encoding in the qubit mapping 236B for qubits 135B and 135C (e.g., to indicate the relationship between qubit 135B and other qubits 135 that are mapped to configuration files of dependencies of dependency A and so on).

In the above described manner, the DDS 235 may create an entry 225 within qubit mapping 236B for each of the services 224 and perform the mapping of configuration files to qubits 135 described hereinabove for each of the services 224 and the dependencies they require to execute.

Given the scale of a dependency analysis for multiple services, the DDS 235 may have to connect to multiple QDDS 133s in order to identify and lock down a sufficient number of qubits 135 from multiple quantum environments 132, thereby forming a quantum system distributed across multiple machines by virtue of entanglement. Once the DDS 235 detects that multiple quantum environments 132 are involved, it may (using the quantum operations 236A) programmatically add entanglement commands to the qubit mapping 236B to ensure a functioning QASM file 236 is available for execution that reflects the environmental conditions and setup (e.g., location/quantum environment of each qubit 135 that has been locked down). The entanglement commands may include quantum logic to create entangled pairs of qubits 135 from different quantum environments. The qubits in an entangled pair can move back and forth between their own and each other's respective quantum environment with the assistance of communication through a classical channel.

Continuing the example of FIGS. 2A, 2B, and 3, the DDS 235 may determine that there are insufficient qubits 135 available on quantum environment 132A for services 224B and 224C and the dependencies they require to execute. Thus, the DDS 235 may then connect to QDDS 133B on quantum environment 132B to interface with qubit registry 134B and determine which qubits 135 on quantum environment 132B are available. The DDS 235 may determine that qubits 135G-J are available (but not qubits 135K and 135L) and annotate the QASM file 236 with the details of the qubits 135 determined to be available (i.e., qubits 135G-J), while the QDDS 133B locks down qubits 135G-J. The DDS 235 may then map the qubits 135G-J to the configuration files of service 225B and its dependencies. In this example, the qubits 135G-J may be not sufficient for service 224B and the configuration files of its dependencies and the DDS 235 may then interface with yet another quantum environment (not shown) in order to identify and lock down the remaining qubits 135 necessary for service 224B and the configuration files of its dependencies. The DDS 235 may then map these remaining qubits 135 to the remaining configuration files of service 225B and its dependencies.

In this manner, the DDS 235 may continue to interface with QDDS 133s until the necessary qubits 135 for all services 224 and the dependencies they require to execute have been located and locked down and the mappings between qubits 135 and the configuration file of each service 224 and its dependencies has been completed. Once the mapping between qubits 135 and the configuration file of each service 224 and the dependencies they require to execute has been completed (and any relevant quantum entanglement commands have been added), the QASM file 236 may be ready for execution in order to identify diamond dependencies as discussed in further detail herein.

Continuing the example of FIGS. 2A, 2B, and 3, once the QASM file 236 is ready for execution, the DDS 235 may instantiate the QASM file 236 using the QDDS 133s involved (i.e., each QDDS 133 from which qubits 135 were locked down) so that the DDA 236C may take the configuration files (i.e., the configuration files for each service 224 and its dependencies) and the encoded relationships between the qubits 135 indicated in the qubit mapping 236B and run the diamond dependency check against those configuration files. More specifically, the DDA 236C may programmatically put the qubits 135 corresponding to each configuration file identified in the qubit mapping 236B into superposition where all permutations and combinations of services 224 and dependencies are possible at the same time. Thus, if there are N qubits, then 2^N permutations and combinations of services 224 and dependencies are possible simultaneously. The DDA 236C collapses down the superposition and returns as a result a list of qubit 135 pairs that are in conflict because they both consume (depend on) the same high level dependency, but consume different version numbers of that same high level dependency.

Figure 3B:
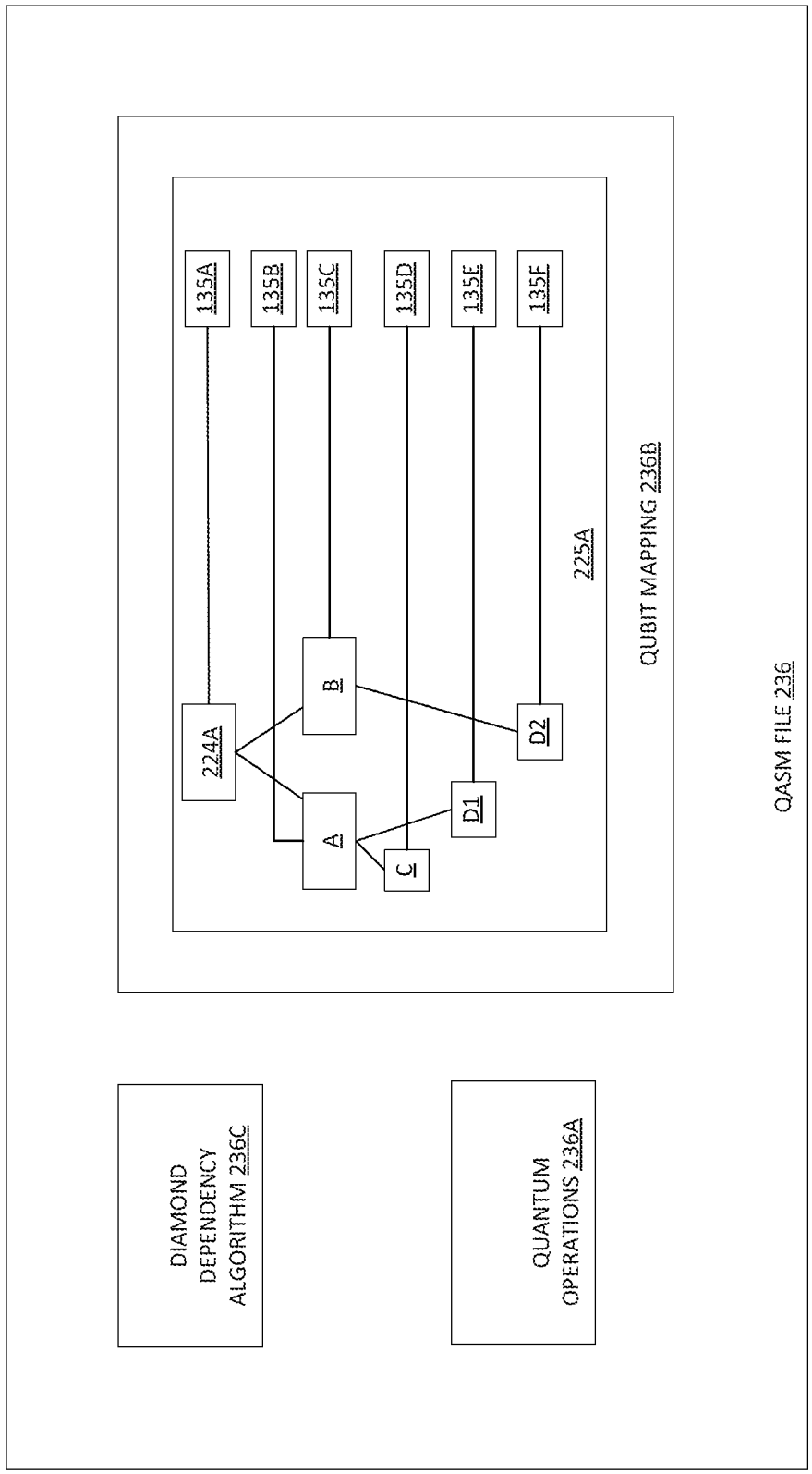
FIG. 3B is a block diagram that illustrates a mapping of configuration files to qubits, in accordance with some embodiments of the present disclosure.

FIG. 3B illustrates an example where qubit 135B may be in conflict with qubit 135C because they (more specifically, the corresponding dependencies thereof) both consume the same primary named dependency but different versions of the primary named dependency—resulting in a qubit/configuration file collision if the service 224A is promoted. More specifically, dependency A and B both depend on different versions of dependency D (D1 and D2 respectively). Thus, the DDA 236C may return a list of qubit pairs that includes qubits 135B and 135C. The DDS 235 can look up the qubit mapping 236B to determine that qubit 135B corresponds to the configuration file of dependency A, and thus may inform the developer that there is a diamond dependency on the configuration file of dependency A for this particular dependency.

In the manner discussed above, every time a user wishes to promote a service 224 to a new environment, the DDS 235 will pull the updated configuration files for the service 224 and its dependencies, generate a dependency tree, create new QASM file indicating the configuration files and relationships there between as well as the mappings to qubits 135 (and relationships among qubits 135), and execute the QASM file using the relevant QDDS 133s to identify the diamond dependencies.

Figure 4:
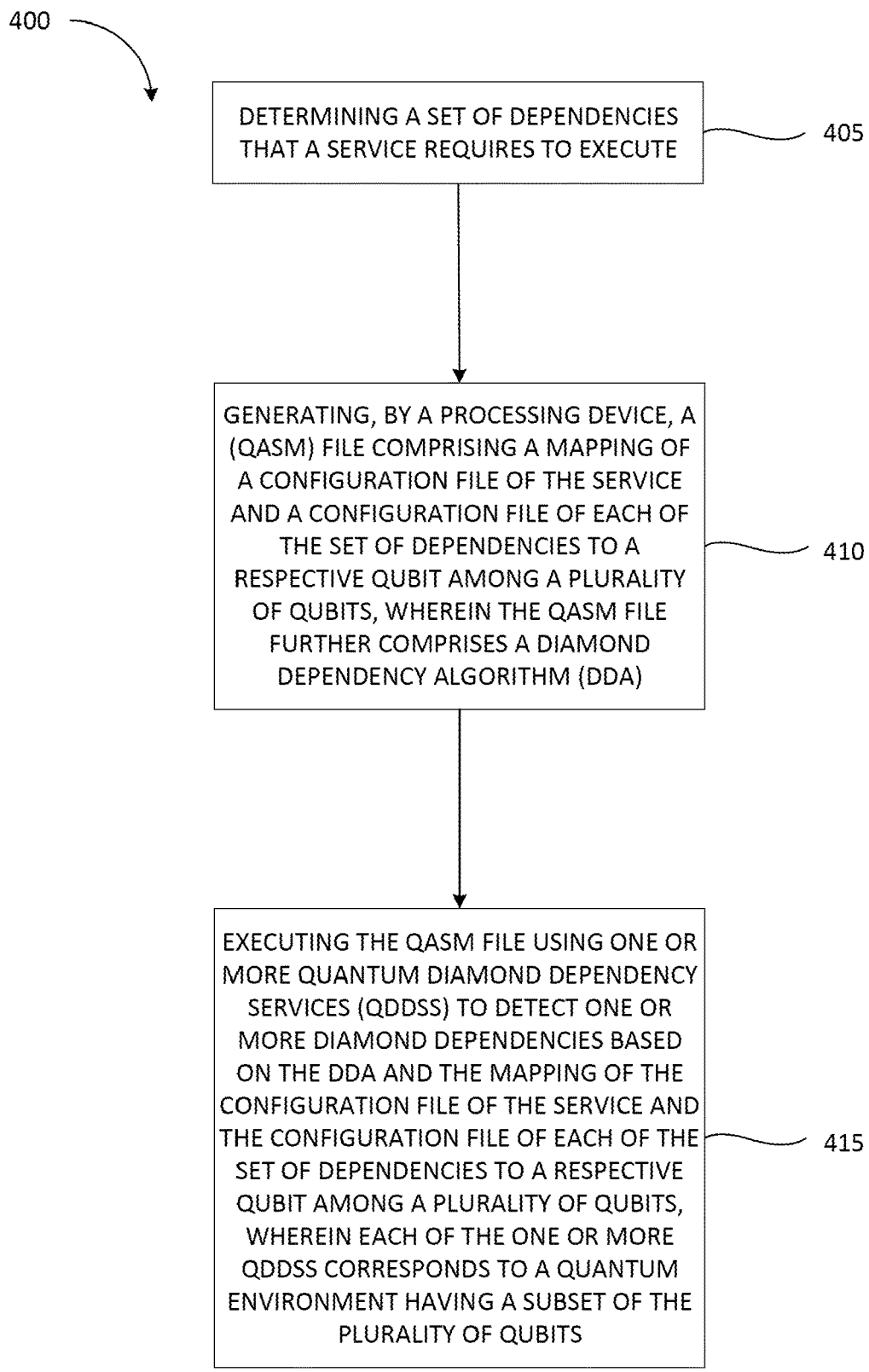
FIG. 4 is a flow diagram of a method performing a quantum computing-based diamond dependency analysis, in accordance with some embodiments of the present disclosure.

FIG. 4 is a flow diagram of a method 400 for detecting diamond dependencies using quantum computing, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed e.g., computing device 110 illustrated in FIGS. 1, 2A, and 2B.

Referring simultaneously to FIGS. 2A, 2B, and 3, at block 405, the DDS 235 may take as input the configuration file for each service 224 and generate a dependency tree of the dependencies required for each service 224 to execute. Because the dependencies of a service 224 may have dependencies themselves (and this can go down several levels), the DDS 235 can analyze the configuration file of each first level dependency (i.e., dependencies that a service 224 directly relies on), generate a second level dependency tree indicating second level dependencies that each first level dependency depends on, and continue in this manner until all dependencies at every level of the service 224 are plotted in its dependency tree. The dependencies required for a service 224 to execute may refer to all dependencies at every level of the service 224.

At block 410, the DDS 235 may generate a QASM file 236 and for each particular service 224, the DDS 235 may create an entry 225 (shown in FIG. 3) in the QASM file 236 with a mapping of the configuration file for that particular service 224 and each dependency in that particular service 224's dependency tree to a respective qubit 135. Whenever a service 224 is modified (whether a new dependency has been added or an existing dependency removed), the DDS 235 updates the relevant entry 225 in the QASM file 236. As shown in FIG. 2, each of the computing devices 130 may include a respective quantum environment 132 comprising a quantum DDS (QDDS) 133, a qubit registry 134, and a set of qubits 135. Each QDDS 133 may include a quantum computer (not shown) which may be any appropriate quantum computing device as discussed hereinabove.

FIG. 3 illustrates a detailed view of the QASM file 236 in accordance with some embodiments of the present disclosure. The QASM file 236 may include quantum operations 236A, qubit mappings 236B, and a diamond dependency algorithm (DDA) 236C. The DDA 236C may be encoded as a quantum program in the QASM file 236. Referring simultaneously to FIGS. 2A, 2B, and 3, the DDS 235 may perform a dependency analysis of each of the services 224 to generate a dependency tree for each of the services 224 as discussed hereinabove. For each particular service 224, the DDS 235 may create an entry 225 in the qubit mapping 236B where the DDS 235 may map the configuration file for the particular service 224 and the configuration file of each dependency in the particular service 224's dependency tree to a qubit 135 of the system 100 in a 1 to 1 relationship.

Referring also to FIGS. 2A, 2B, and 3 (illustrating this process with respect to service 224A) simultaneously, the DDS 235 may create entry 225A within qubit mapping 236B and connect to a QDDS 133 (e.g., QDDS 133A), so as to interface with the qubit registry 134A and determine which qubits 135A-F are available. The qubit registry 134A may report its available qubits 135 so that the DDS 235 may make this determination. The DDS 235 may determine that qubits 135A-F are all available and directly annotate the QASM file 236 (and particularly, the qubit mapping 236B) with the details of the qubits 135 determined to be available (i.e., qubits 135A-F), while the QDDS 133A locks down qubits 135A-F. This ensures that there will be a general mapping of configuration files to real qubits 135 on a physical quantum environment 132.

The DDS 235 may map qubit 135A to the configuration file of service 224A. The configuration file of service 224A may indicate that service 224A is dependent on dependencies A and B (shown as "A" and "B" in FIG. 3), and thus the DDS 235 may map qubits 135B and 135C to the configuration files of dependencies A and B (i.e., first level dependencies of service 224A) respectively. The configuration file of dependency A may indicate the dependencies that dependency A is dependent on (dependencies C and D) and the configuration file of dependency B may indicate the dependencies that dependency B is dependent on (dependency E). Thus, the DDS 235 may map additional qubits 135, namely qubits 135D, E, and F to the dependencies C, D, and E respectively of dependencies A and B (i.e., second level dependencies). For qubit 135A (mapped to the configuration file for service 224A), the DDS 235 may encode within the qubit mapping 236B, qubit 135A's relationship with qubits 135B and 135C (not shown), which represent (are mapped to) configuration files of dependencies A and B respectively. The DDS 235 may also encode in the qubit mapping 236B, a reference to this relationship between qubit 135A and qubits 135B and 135C. Similarly, for each of qubits 135B and 135C, the DDS 235 may perform a similar encoding in the qubit mapping 236B for qubits 135B and 135C (e.g., to indicate the relationship between qubit 135B and other qubits 135 that are mapped to configuration files of dependencies of dependency A and so on). In the above described manner, the DDS 235 may create an entry 225 within qubit mapping 236B for each of the services 224 and perform the mapping of configuration files to qubits 135 described hereinabove for each of the services 224.

At block 415, the DDS 235 may instantiate the QASM file 236 using the QDDS 133s so that the DDA 236C may take the configuration files (i.e., the configuration files for each service 224 and each dependency the service 224 requires to execute) and the encoded relationships between the qubits 135 indicated in the qubit mapping 236B and run the diamond dependency check against those configuration files. More specifically, the DDA 236C may programmatically put the qubits 135 corresponding to each configuration file identified in the qubit mapping 236B into superposition where all permutations and combinations of services 224 and dependencies are possible at the same time. Thus, if there are N qubits, then 2^N permutations and combinations of services 224 and dependencies are possible simultaneously. The DDA 236C collapses down the superposition and returns as a result a list of qubit 135 pairs that are in conflict because they (their corresponding dependencies) both consume (depend on) the same high level dependency, but consume different version numbers of that same high level dependency.

For example, qubit 135B may be in conflict with qubit 135C because they (more specifically, the corresponding dependencies thereof) both consume the same primary named dependency but different versions of the primary named dependency—resulting in a qubit/configuration file collision if the service 224A is promoted. The DDS 235 can look up the qubit mapping 236B to determine that qubit 135B corresponds to the configuration file of dependency A, and thus may inform the developer that there is a diamond dependency on the configuration file of dependency A for this particular dependency.

In the manner discussed above, every time a user wishes to promote a service 224 to a new environment, the DDS 235 will pull the updated configuration files for the service 224 and the dependencies it requires to execute, generate a dependency tree, create new QASM file indicating the configuration files and relationships there between as well as the mappings to qubits 135 (and relationships among qubits 135), and execute the QASM file using the QDDS 133s to identify the diamond dependencies.

Figure 5:
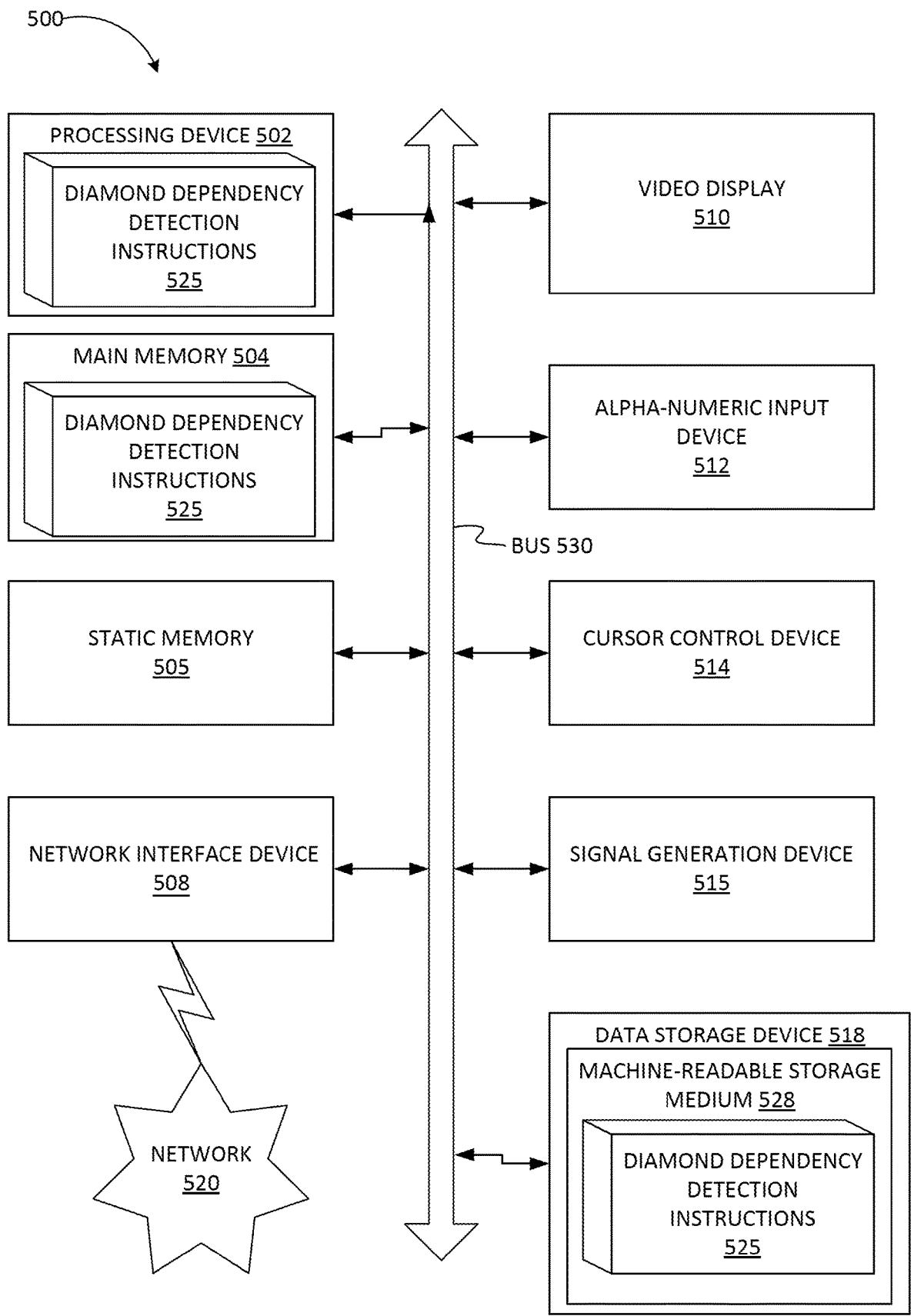
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for detecting diamond dependencies using quantum computing techniques.

In alternative embodiments, the computer system 500 may be connected (e.g., networked) to other machines in a local area network (LAN), an intranet, an extranet, or the Internet. The computer system 500 may operate in the capacity of a server or a client machine in a client-server network environment, or as a peer machine in a peer-to-peer (or distributed) network environment. The computer system 500 may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single computer system is illustrated, the terms "computer system" and "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute diamond dependency detection instructions 525, for performing the operations and steps discussed herein.

The data storage device 518 may include a machine-readable storage medium 528, on which is stored one or more sets of diamond dependency detection instructions 525 (e.g., software) embodying any one or more of the methodologies of functions described herein. The diamond dependency detection instructions 525 may also reside, completely or at least partially, within the main memory 504 or within the processing device 502 during execution thereof by the computer system 500; the main memory 504 and the processing device 502 also constituting machine-readable storage media. The diamond dependency detection instructions 525 may further be transmitted or received over a network 520 via the network interface device 508.

The machine-readable storage medium 528 may also be used to store instructions to perform a method for object analysis/validation event publishing, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
   determining a set of dependencies that a service requires to execute;
   generating, by a processing device, a quantum assembly language (QASM) file comprising a mapping of a configuration file of the service and a configuration file of each of the set of dependencies to a respective qubit among a plurality of qubits, wherein the QASM file further comprises a diamond dependency algorithm (DDA);
   executing the QASM file using one or more quantum diamond dependency services (QDDSs) to detect one or more diamond dependencies based on the DDA and the mapping of the configuration file of the service and the configuration file of each of the set of dependencies to a respective qubit among a plurality of qubits, wherein each of the one or more QDDSs corresponds to a quantum environment having a subset of the plurality of qubits; and
   connecting to the one or more quantum diamond dependency services (QDDSs) to identify a respective available qubit for the service and a respective available qubit for each of the set of dependencies; and as the respective available qubit for the service and the respective available qubit for each of the set of dependencies is identified, locking the respective available qubit down.

2. The method of claim 1, wherein connecting to the one or more QDDSs comprises: iteratively, until a respective available qubit for the service and a respective available qubit for each of the set of dependencies are identified: connecting to a QDDS to interface with a qubit registry of a quantum environment corresponding to the QDDS; determining, via the qubit registry, a set of available qubits in the quantum environment; and determining whether a respective available qubit for the service and a respective available qubit for each of the set of dependencies have been identified based on the set of available qubits in the quantum environment.

3. The method of claim 1, further comprising: in response to connecting to more than one QDDS to identify a respective available qubit for the service and a respective available qubit for each of the set of dependencies, adding entanglement commands to the QASM file to account for each quantum environment from which respective available qubits are identified while detecting the one or more diamond dependencies.

4. The method of claim 1, further comprising: annotating the QASM file with an indication of a relationship each respective qubit has with other respective qubits based on a configuration file each respective qubit is mapped to.

5. The method of claim 1, further comprising: returning a list of each respective qubit that is in conflict based on the detected one or more diamond dependencies.

6. The method of claim 1, wherein the generating of the QASM file is performed by a classical diamond dependency service.

7. A system comprising:
   a memory; and
   a processing device operatively coupled to the memory, the processing device to:
   determine a set of dependencies that a service requires to execute;
   generate a quantum assembly language (QASM) file comprising a mapping of a configuration file of the service and a configuration file of each of the set of dependencies to a respective qubit among a plurality of qubits, wherein the QASM file further comprises a diamond dependency algorithm (DDA);
   execute the QASM file using one or more quantum diamond dependency services (QDDSs) to detect one or more diamond dependencies based on the DDA and the mapping of the configuration file of the service and the configuration file of each of the set of dependencies to a respective qubit among a plurality of qubits, wherein each of the one or more QDDSs corresponds to a quantum environment having a subset of the plurality of qubits; and
   connect to the one or more quantum diamond dependency services (ODDSs) to identify a respective available qubit for the service and a respective available qubit for each of the set of dependencies, wherein as the respective available qubit for the service and the respective available qubit for each of the set of dependencies is identified, the respective available qubit is locked down by a QDDS corresponding to a quantum environment on which the respective available qubit is located.

8. The system of claim 7, wherein to connect to the one or more QDDSs, the processing device is to: iteratively, until a respective available qubit for the service and a respective available qubit for each of the set of dependencies are identified: connect to a QDDS to interface with a qubit registry of a quantum environment corresponding to the QDDS; determine, via the qubit registry, a set of available qubits in the quantum environment; and determine whether a respective available qubit for the service and a respective available qubit for each of the set of dependencies have been identified based on the set of available qubits in the quantum environment.

9. The system of claim 7, wherein the processing device is further to: in response to connecting to more than one QDDS to identify a respective available qubit for the service and a respective available qubit for each of the set of dependencies, add entanglement commands to the QASM file to account for each quantum environment from which respective available qubits are identified while detecting the one or more diamond dependencies.

10. The system of claim 7, wherein the processing device is further to:
annotate the QASM file with an indication of a relationship each respective qubit has with other respective qubits based on a configuration file each respective qubit is map ped to.

11. The system of claim 7, wherein the processing device is further to: return a list of each respective qubit that is in conflict based on the detected one or more diamond dependencies.

12. The system of claim 7, wherein the processing device executes a classical diamond dependency service to generate the QASM file.

13. A non-transitory computer-readable medium having instructions stored thereon which, when executed by a processing device, cause the processing device to:
determine a set of dependencies that a service requires to execute;
generate a quantum assembly language (QASM) file comprising a mapping of a configuration file of the service and a configuration file of each of the set of dependencies to a respective qubit among a plurality of qubits, wherein the QASM file further comprises a diamond dependency algorithm (DDA);
execute the QASM file using one or more quantum diamond dependency services (QDDSs) to detect one or more diamond dependencies based on the DDA and the mapping of the configuration file of the service and the configuration file of each of the set of dependencies to a respective qubit among a plurality of qubits, wherein each of the one or more QDDSs corresponds to a quantum environment having a subset of the plurality of qubits; and
connect to the one or more quantum diamond dependency services (QDDSs) to identify a respective available qubit for the service and a respective available qubit for each of the set of dependencies, wherein as the respective available qubit for the service and the respective available qubit for each of the set of dependencies is identified, the respective available qubit is locked down by a QDDS corresponding to a quantum environment on which the respective available qubit is located.

14. The non-transitory computer-readable medium of claim 13, wherein to connect to the one or more QDDSs, the processing device is to: iteratively, until a respective available qubit for the service and a respective available qubit for each of the set of dependencies are identified: connect to a QDDS to interface with a qubit registry of a quantum environment corresponding to the QDDS; determine, via the qubit registry, a set of available qubits in the quantum environment; and determine whether a respective available qubit for the service and a respective available qubit for each of the set of dependencies have been identified based on the set of available qubits in the quantum environment.

15. The non-transitory computer-readable medium of claim 13, wherein the processing device is further to: in response to connecting to more than one QDDS to identify a respective available qubit for the service and a respective available qubit for each of the set of dependencies, add entanglement commands to the QASM file to account for each quantum environment from which respective available qubits are identified while detecting the one or more diamond dependencies.

16. The non-transitory computer-readable medium of claim 13, wherein the processing device is further to: annotate the QASM file with an indication of a relationship each respective qubit has with other respective qubits based on a configuration file each respective qubit is mapped to.

17. The non-transitory computer-readable medium of claim 13, wherein the processing device executes a classical diamond dependency service to generate the QASM file.

* * * * *